United States Patent
Song et al.

(10) Patent No.: US 11,389,787 B2
(45) Date of Patent: Jul. 19, 2022

(54) CATALYST STRUCTURE AND METHOD OF UPGRADING HYDROCARBONS IN THE PRESENCE OF THE CATALYST STRUCTURE

(71) Applicant: Kara Energy Services Inc., Calgary AB (CA)

(72) Inventors: Hua Song, Calgary (CA); Blair Aiken, Calgary (CA); Peng He, Beijing (CN); Shijun Meng, Calgary (CA)

(73) Assignee: Kara Technologies Inc., Calgary (CA)

( * ) Notice: Subject to any disclaimer, the term of this patent is extended or adjusted under 35 U.S.C. 154(b) by 2 days.

(21) Appl. No.: 16/792,574

(22) Filed: Feb. 17, 2020

(65) Prior Publication Data
US 2020/0261894 A1    Aug. 20, 2020

Related U.S. Application Data

(60) Provisional application No. 62/807,795, filed on Feb. 20, 2019.

(51) Int. Cl.
*B01J 29/06* (2006.01)
*B01J 29/08* (2006.01)
(Continued)

(52) U.S. Cl.
CPC ............. *B01J 29/085* (2013.01); *B01J 6/001* (2013.01); *B01J 29/061* (2013.01); *B01J 29/064* (2013.01); *B01J 29/068* (2013.01); *B01J 29/072* (2013.01); *B01J 29/076* (2013.01); *B01J 29/088* (2013.01); *B01J 29/10* (2013.01); *B01J 29/106* (2013.01); *B01J 29/12* (2013.01); *B01J 29/14* (2013.01); *B01J 29/146* (2013.01); *B01J 29/16* (2013.01); *B01J 29/166* (2013.01); *B01J 29/405* (2013.01); *B01J 29/42* (2013.01); *B01J 29/44* (2013.01); *B01J 29/46* (2013.01); *B01J 29/48* (2013.01); *B01J 35/10* (2013.01); *B01J 37/0009* (2013.01); *B01J 37/0201* (2013.01); *B01J 37/08* (2013.01); *B01J 37/088* (2013.01); *C10G 11/05* (2013.01); *C10G 11/10* (2013.01); *C10G 11/14* (2013.01); *C10G 11/16* (2013.01); *C10G 11/18* (2013.01); *C10G 11/182* (2013.01); *C10G 35/065* (2013.01); *C10G 35/095* (2013.01); *C10G 35/10* (2013.01); *C10G 35/12* (2013.01); *C10G 35/14* (2013.01); *C10G 45/12* (2013.01); *C10G 45/14* (2013.01); *C10G 45/16* (2013.01); *C10G 45/18* (2013.01); *C10G 45/20* (2013.01); *C10G 45/54* (2013.01); *C10G 45/64* (2013.01);
(Continued)

(58) Field of Classification Search
CPC .... C10G 2300/70; C10G 11/05; C10G 11/10; C10G 11/14; C10G 11/16; C10G 11/18; C10G 11/182; C10G 35/065; C10G 35/095; C10G 35/10; C10G 35/12; C10G 35/14; C10G 47/16; C10G 47/20; C10G 45/12; C10G 45/14; C10G 45/16; C10G 45/18; C10G 45/20; C10G 45/54; C10G 45/64; C10G 45/66; B01J 6/001; B01J 37/0009; B01J 37/08; B01J 37/088; B01J 37/0201; B01J 2229/186; B01J 2229/42; B01J 29/061; B01J 29/064; B01J 29/068; B01J 29/072; B01J 29/076; B01J 29/085; B01J 29/088; B01J 29/10; B01J 29/106; B01J 29/12; B01J 29/126; B01J 29/14; B01J 29/146; B01J 29/16; B01J 29/166; B01J 29/405; B01J 29/42; B01J 29/44; B01J 29/46; B01J 29/48; B01J 29/60; B01J 29/605; B01J 29/61; B01J 29/62; B01J 29/63; B01J 29/64; B01J 29/7053; B01J 29/7207; B01J 29/7407; B01J 29/7607; B01J 29/7807
USPC ............... 502/60, 61, 63, 64, 66, 71, 74, 77; 208/208 R, 209, 213, 217, 134, 135, 136, 208/137
See application file for complete search history.

(56) References Cited

U.S. PATENT DOCUMENTS

| 3,471,412 | A | 10/1969 | Miale et al. |
| 5,116,794 | A | 5/1992 | Skeels et al. |
| 5,269,909 | A | 12/1993 | Ovalles et al. |

(Continued)

FOREIGN PATENT DOCUMENTS

| CN | 2645080 Y | 9/2004 |
| CN | 1598568 A | 3/2005 |

(Continued)

OTHER PUBLICATIONS

First Examination Report for Indian Patent Application No. 202147037396, dated Oct. 7, 2021 with English translation, 5 pages.
(Continued)

*Primary Examiner* — Elizabeth D Wood
(74) *Attorney, Agent, or Firm* — Edell, Shapiro & Finnan, LLC

(57) ABSTRACT

A catalyst structure includes a porous support structure, where the support structure includes an aluminosilicate material. Any two or more metals are loaded in the porous support structure, the two or more metals selected from the group consisting of Ga, Ag, Mo, Zn, Co and Ce, where each metal loaded in the porous support structure is present in an amount from about 0.1 wt % to about 20 wt %. In example embodiments, the catalyst structure includes three or more of the metals loaded in the porous support structure. The catalyst structure is used in a hydrocarbon upgrading process that is conducted in the presence of methane, nitrogen or hydrogen.

22 Claims, 1 Drawing Sheet

(51) Int. Cl.

| | | |
|---|---|---|
| *B01J 35/10* | (2006.01) | |
| *B01J 6/00* | (2006.01) | |
| *B01J 37/00* | (2006.01) | |
| *B01J 37/08* | (2006.01) | |
| *B01J 37/02* | (2006.01) | |
| *B01J 29/064* | (2006.01) | |
| *B01J 29/072* | (2006.01) | |
| *B01J 29/12* | (2006.01) | |
| *B01J 29/068* | (2006.01) | |
| *B01J 29/076* | (2006.01) | |
| *B01J 29/10* | (2006.01) | |
| *B01J 29/48* | (2006.01) | |
| *B01J 29/46* | (2006.01) | |
| *B01J 29/14* | (2006.01) | |
| *B01J 29/42* | (2006.01) | |
| *B01J 29/16* | (2006.01) | |
| *B01J 29/40* | (2006.01) | |
| *B01J 29/44* | (2006.01) | |
| *C10G 11/10* | (2006.01) | |
| *C10G 35/06* | (2006.01) | |
| *C10G 11/18* | (2006.01) | |
| *C10G 11/16* | (2006.01) | |
| *C10G 11/14* | (2006.01) | |
| *C10G 11/05* | (2006.01) | |
| *C10G 35/14* | (2006.01) | |
| *C10G 47/20* | (2006.01) | |
| *C10G 35/10* | (2006.01) | |
| *C10G 35/12* | (2006.01) | |
| *C10G 47/12* | (2006.01) | |
| *C10G 47/16* | (2006.01) | |
| *C10G 35/095* | (2006.01) | |
| *C10G 45/16* | (2006.01) | |
| *C10G 45/20* | (2006.01) | |
| *C10G 45/64* | (2006.01) | |
| *C10G 45/12* | (2006.01) | |
| *C10G 45/18* | (2006.01) | |
| *C10G 45/66* | (2006.01) | |
| *C10G 45/14* | (2006.01) | |
| *C10G 45/54* | (2006.01) | |

(52) U.S. Cl.
CPC ............ *C10G 45/66* (2013.01); *C10G 47/12* (2013.01); *C10G 47/16* (2013.01); *C10G 47/20* (2013.01); *B01J 2208/00858* (2013.01); *B01J 2208/028* (2013.01); *B01J 2229/186* (2013.01); *B01J 2229/42* (2013.01); *C10G 2300/70* (2013.01)

(56) References Cited

U.S. PATENT DOCUMENTS

| | | | |
|---|---|---|---|
| 5,536,895 | A | 7/1996 | Nair et al. |
| 6,017,442 | A | 1/2000 | Wu et al. |
| 6,579,444 | B2 | 6/2003 | Feimer et al. |
| 7,806,947 | B2 | 10/2010 | Gunnerman et al. |
| 7,880,044 | B2 | 2/2011 | Gunnerman et al. |
| 7,897,124 | B2 | 3/2011 | Gunnerman et al. |
| 8,066,869 | B2 | 11/2011 | Nicolaos et al. |
| 8,092,766 | B2 | 1/2012 | Ghorishi et al. |
| 8,203,027 | B2 | 6/2012 | Gunnerman et al. |
| 8,226,817 | B2 | 7/2012 | Gunnerman et al. |
| 2007/0170093 | A1 | 7/2007 | Jeong et al. |
| 2009/0249682 | A1 | 10/2009 | Gunnerman et al. |
| 2009/0288990 | A1* | 11/2009 | Xie .................. B01J 29/80 208/120.05 |
| 2011/0000128 | A1 | 1/2011 | Gunnerman et al. |
| 2011/0049014 | A1 | 3/2011 | Gunnerman et al. |
| 2016/0024392 | A1* | 1/2016 | Keusenkothen ........ C07C 6/126 585/321 |
| 2018/0029022 | A1 | 2/2018 | Pereira Almao et al. |
| 2018/0043341 | A1 | 2/2018 | Pereira Almao et al. |
| 2019/0366310 | A1 | 12/2019 | Monguillon et al. |

FOREIGN PATENT DOCUMENTS

| | | | |
|---|---|---|---|
| CN | 103933995 | A | 7/2014 |
| CN | 104056658 | A | 9/2014 |
| CN | 104069852 | A | 10/2014 |
| CN | 104096571 | A | 10/2014 |
| CN | 104907076 | A | 9/2015 |
| CN | 205603525 | U | 9/2016 |
| CN | 205603535 | U | 9/2016 |
| CN | 205627574 | U | 10/2016 |
| CN | 205628890 | U | 10/2016 |
| CN | 107029780 | A | 8/2017 |
| CN | 108300504 | A | 7/2018 |
| RU | 2005119994 | | 4/2007 |
| WO | 2020170042 | A1 | 8/2020 |

OTHER PUBLICATIONS

Megumu Inaba, et al., Production of Phenolic Compounds by Fast Pyrolysis of Eucalyptus Woody Biomass Using Modified Zeolite Catalysts, Journal of Japan Institute of Energy, 93, pp. 909-915, Feb. 27, 2014, 7 pages.

Aijun Guo et al., Low-temperature and low-pressure non-oxidative activation of methane for upgrading heavy oil, Catalysis Science & Technology, Royal Society of Chemistry, 2016, pp. 1201-1213.

Peng He, et al., Catalytic bitumen partial upgrading over Ag—Ga/ZSM-5 under methane environment, ScienceDirect Fuel Processing Technology, 2017, pp. 290-297.

Peng He, et al., Bitumen partial upgrading over Mo/ZSM-5 under methane environment: Methane participation investigation, ScienceDirect Applied Catalysis B: Environmental, 2016, pp. 438-450.

Lulu Zhao et al., Catalytic Bitumen Partial Upgrading under Methane Environment over Ag—Mo—Ce/ZSM-5 Catalyst and Mechanistic Study Using N-Butylbenzene as Model Compound, energy &fuels, ACS Publications, 2016 American Chemical Society, pp. 10330-10340.

He, P., Xiao, Y., Tang, Y., Zhang, J., Song, H.*, "Simultaneous Low-Cost Carbon Sources and CO2 Valorizations through Catalytic Gasification", Energy & Fuels, (2015) 29 (11), 7497-7507.

He, P., Jarvis, J., Liu, L., Song, H.*, "The promoting effect of Pt on the co-aromatization of pentane with methane and propane over Zn—Pt/HZSM-5", Fuel (2019) 239, 946-954.

Meng et al., "Non-thermal plasma assisted catalytic reforming of naphtha and its model compounds with methane at near ambient conditions", Applied Catalysis B: Environmental (2021), 11 pages.

Hao Xu et al., "Methane-assisted waste cooking oil conversion for renewable fuel production", Science Direct (2022), 9 pages.

Jarvis et al., "Inhibiting the Dealkylation of Basic Arenes during n-Alkane Direct Aromatization Reactions and Understanding the C6 Ring Closure Mechanism", ACS Catalysis (2020), pp. 8428-8443.

Hao Xu et al., "Highly selective skeletal isomerization of cyclohexene over zeolite-based catalysts for high-purity methylcyclopentene production", communications chemistry (2021), 9 pages.

Zhaofei Li, et al., "Effect of methane presence on catalytic heavy oil partial upgrading", ScienceDirect (2021), 8 pages.

Hoa Xu et al., "Catalytic vacuum residue upgrading under methane: Evaluation of process feasibility, stability and versatility", ScienceDirect (2022), 8 pages.

Yimeng Li et al., "Catalytic methanotreating of vegetable oil: A pathway to Second-generation biodiesel", ScienceDirect (2022), 8 pages.

Yimeng Li et al., Catalytic desulfurization of marine gas oil and marine diesel oil under methane environment, ScienceDirect (2021) 6 pages.

(56) References Cited

OTHER PUBLICATIONS

Hao Xu et al., "Catalytic asphaltene upgrading under methane environment: Solvent effect and its interaction with oil components", ScienceDirect, (2021) 7 pages.
Wenping Li et al., "The function of porous working electrodes for hydrogen production from water splitting in non-thermal plasma reactor", ScienceDirect (2022), 9 pages.
Hoa Xu et al., "Organic solid waste upgrading under natural gas for valuable liquid products formation: Pilot demonstration of a highly integrated catalytic process", ScienceDirect (2022), 10 pages.
Hao Xu et al., "The interactive role of methane beyond a reactant in crude oil upgrading", communications chemistry (2021), 12 pages.
Shan, W., Song, H.*, "Catalysts for the Selective Catalytic Reduction of NOx with NH3 at Low Temperature", Catalysis Science & Technology, (2015) 5, 4280-4288.
Song, H., Zhang, L., Ozkan, U.S., "The Effect of Surface Acidic and Basic Properties on the Performance of Cobalt-Based Catalysts for Ethanol Steam Reforming", Topics in Catalysis, (2012) 55 (19-20), 1324-1331.
Song, H.; Shan, W.; Xiao, Y.; Cheng, W. "Catalytic biomass pyrolysis under methane-rich gas for upgraded bio-oil production", 65th Canadian Chemical Engineering Conference, Calgary, AB, Oct. 2015.
Song, H.*, Meng, S., Wang, A., He, P., "Catalytic Methane Valorization at Mild Conditions through Coupling Effect", 69th Canadian Chemical Engineering Conference, Halifax, NS, Oct. 2019 (Invited keynote).
Song, Hua "Catalytic low cost carbon resources pyrolysis under natural gas for upgraded oil production" Mar. 2014 Conference: 247th National Spring Meeting of the American-Chemical-Society (ACS), vol. 247.
Song, H.; Guo, A.; Wu, C.; Zhang, D.; Luan, Y.; Zhao, L. "Catalytic heavy crude oil upgrading using natural gas", 249th ACS National meeting, Denver, CO, Mar. 2015.
Song, H.*; Zhao, L.; He, P. "Catalytic Bitumen Partial Upgrading Under Methane Environment", 2016 AICHE National Meeting, San Francisco, CA, Nov. 2016.
Wang, A., He, P., Song, H.*, "Lignin valorization", Recent Advances in Bioconversion of Lignocellulose to Biofuels and Value Added Chemicals within the Biorefinery Concept, ISBN 978-0-12-818223-9, Elsevier (2020).
Aiguo Wang et al., "Catalytic Upgrading of Biomass and Its Model Compounds under Methane Environment" Conference Paper, University of Calgary, 1 page.
He, P. et al., "Catalytic Light Olefin Upgrading under Methane Environment", 254th ACS National meeting, University of Calgary, Aug. 2017, 44 pages.
He, P. et al., "Catalytic Upgrading of Low Cost Carbon Resources Under Methane Environment", University of Calgary, Sep. 2018, 44 pages.
Notification of Transmittal of International Search Report and Written Opinion including International Search Report and Written Opinion for International Application No. PCT/IB2020/000151 dated Jul. 10, 2020, 10 pages.
Juybar, M. et al, Conversion of methanol to aromatics over ZSM-5/11 intergrowth Zeolites and bimetallic ZN—Cu—ZSM-5/11 . . . , J.Chem. Sci (2019) 131:104, 14 pages.
Uslamin, E.A. et al., Aromatization of ethylene over zeolite-based catalysts, Catalysis Science & Technology, Jan. 6, 2020, 10 pp. 2774-2785, 13 pages.
Harrhy, J., Wang, A., Jarvis , J., He, P., Meng, S., Yung, M., Liu, L., Song, H., "Understanding zeolite deactivation by sulphur poisoning during direct olefin upgrading", Nature Communications Chemistry, (2019), 2, 37.
He, P., Song, H.*, "Catalytic Natural Gas Utilization on Unconventional Oil Upgrading", Advances in Natural Gas Emerging Technologies, ISBN 978-953-51-3433-6, Rijeka, Croatia: InTech (2017).
Wang, A., Austin, D., Song, H.*, "Catalytic Biomass Valorization", Biomass Volume Estimation and Valorization for Energy, ISBN 978-953-51-2937-0, Rijeka, Croatia: InTech (2017).
"Catalytic Hydrogen Production from Bioethanol", Bioethanol (2012) MAP Lima, Hua Song p. 255.
Song, H.; Ozkan, U.S. "Hydrogen Production from Steam Reforming of Bio-Ethanol over Non-Precious Metal Catalysts", 21st North American Catalysis Society Meeting, San Francisco, CA, Jun. 2009.
H Song, RB Watson, P Matter, D Braden, U Ozkan, "Alcohol Steam Reforming for Hydrogen Production", (2005) 2005 AIChE Annual Meeting.
Austin, D., Wang, A., Harrhy, J., Mao, X., Zeng, H., Song, H.*, "Catalytic Aromatization of Acetone as a Model Compound for Biomass Derived Oil under Methane Environment", Catalysis Science & Technology (2018) 8, 5104-5114.
Austin, D.; Wang, A.; He, P.; Qian, H.; Zeng, H.; Song, H.*, "Catalytic Valorization of Biomass Derived Glycerol under Methane: Effect of Catalyst Synthesis Method", Fuel, (2018) 216, 218-226.
He, P., Song, H.* , "Catalytic Conversion of Biomass by Natural Gas for Oil Quality Upgrading", Industrial & Engineering Chemistry Research, (2014) 53 (41), 15862-15870.
He, P., Shan, W., Xiao, Y., Song, H.*, "Performance of Zn/ZSM-5 for In Situ Catalytic Upgrading of Pyrolysis Bio-oil by Methane", Topics in Catalysis, (2016) 59(1), 86-93.
Peng, H., Wang, A., He, P., Harrhy, J., Meng, S., Song, H.*, "Solvent-free catalytic conversion of xylose with methane to aromatics over Zn—Cr modified zeolite catalyst", Fuel, (2019), 253, 988-996.
Peng, H., Wang, A., He, P., Meng, S., Song, H.*, "One-pot direct conversion of bamboo to aromatics under methane", Fuel (2020), 267, 117196.
Wang, A., Austin, D., He, P., Ha, M., Michaelis, V., Liu, L., Qian, H., Zeng, H., Song, H.*, "Mechanistic Investigation on Catalytic Deoxygenation of Phenol as a Model Compound of Biocrude Under Methane", ACS Sustainable Chemistry & Engineering (2019) 7(1), 1512-1523.
Wang, A., Austin, D., He, P., Mao, X., Zeng, H., Song, H.*, "Direct Catalytic Co-conversion of Cellulose and Methane to Renewable Petrochemicals", Catalysis Science & Technology, (2018) 8, 5632-5645.
Wang, A., Austin, D., Karmakar, A., Bernard, G., Michaelis, V., Yung, M., Zeng, H., Song, H.*, "Methane Upgrading of Acetic Acid as a Model Compound for Biomass Derived Liquid over Modified Zeolite Catalyst", ACS Catalysis (2017) 7, 3681-3692.
Wang, A., Austin, D., Qian, H., Zeng, H., Song, H.*, "Catalytic Valorization of Furfural Under Methane Environment", ACS Sustainable Chemistry & Engineering (2018) 6 (7), 8891-8903.
Wang, A., Austin, D., Song, H.*, "Investigations of thermochemical upgrading of biomass and its model compounds: Opportunities for methane utilization", Fuel, (2019) 246, 443-453.
Wang, A., He, P., Yung, M., Zeng, H., Qian, H., Song, H.*, "Catalytic Co-Aromatization of Ethanol and Methane", Applied Catalysis B: Environmental, (2016) 198, 480-492.
Wang, A., Austin, D., Song, H.*, "Catalytic Upgrading of Biomass and its Model Compounds for Fuel Production", Current Organic Chemistry, (2019), 23(5), 517-529.
Wang, A., Song, H.*, "Maximizing the Production of Aromatic Hydrocarbons from Lignin Conversion by Coupling Methane Activation", Bioresource Technology, (2018) 268, 505-513.
Xiao, Y., He, P., Cheng, W., Liu, J., Shan, W., Song, H.*, "Converting Solid Wastes into Liquid Fuel using a Novel Methanolysis Process", Waste Management, (2016) 49, 304-310.
Guo, A., Zhou, Y., Chen, K., Xue, Z., Wang, Z., Song, H.* , "Co-processing of Vacuum Residue/Fraction Oil Blends: Effect of Fraction Oils Recycle on the Stability of Coking Feedstock", Journal of Analytical and Applied Pyrolysis (2014 ) 109, 109-115.
He, P., Chen, Y., Jarvis, J., Meng, S., Liu, L., Wen, X., Song, H.*, "Highly selective aromatization of octane over Pt—Zn/UZSM-5: The effect of Pt—Zn interaction and Pt position", ACS Applied Materials & Interfaces, (2020), DOI: 10.1021/acsami.0c07039.

(56) References Cited

OTHER PUBLICATIONS

He, P., Gatip, R., Yung, M., Zeng, H., Song, H.*, "Co-Aromatization of Olefin and Methane over Ag—Ga/ZSM-5 Catalyst at Low Temperature", Applied Catalysis B: Environmental (2017) 211, 275-288.
He, P., Jarvis, J., Meng, S., Li, Q., Bernard, G., Liu, L., Mao, X., Jiang, Z., Zeng, H., Michaelis, V., Song, H.*, "Co-aromatization of methane with propane over Zn/HZSM-5: The methane reaction pathway and the effect of Zn distribution", Applied Catalysis B: Environmental , (2019) 250, 99-111.
He, P., Jarvis, J., Meng, S., Wang A., Kou, S., Gatip, R., Yung, M., Liu, L., Song, H.*, "Co-Aromatization of Methane with Olefins: The Role of Inner Pore and External Surface Catalytic Sites", Applied Catalysis B: Environmental, (2018), 234, 234-246.
He, P., Meng, S., Song, Y., Liu, B., Song, H.*, "Heavy Oil Catalytic Upgrading under Methane Environment: A Small Pilot Plant Evaluation", Fuel , (2019), 258, 116161.
He, P., Wang, A., Meng, S., Bernard, G., Liu, L., Michaelis, V., Song, H.*, "Impact of AI sites on the methane co-aromatization with alkanes over Zn/HZSM-5", Catalysis Today (2019) 323, 94-104.
Investigation on the light alkanes aromatization over Zn and Ga modified HZSM-5 catalysts in the presence of methane, Q Li, F Zhang, J Jarvis, P He, M Yung, A Wang, K Zhao, H Song (2018) Fuel 219, 331-339.
Jarvis, J., Harrhy, J., He, P., Wang, A., Liu, L., Song, H.*, "Highly Selective Aromatization and Isomerization of n-Alkanes from Bimetallic Pt—Zn Nanoparticles Supported on a Uniform Aluminosilicate", Chemical Communications, (2019) 55, 3355-3358.
Jarvis, J., Wong, A., He, P., Li, Q., Song, H.*, "Catalytic aromatization of naphtha under methane environment: Effect of surface acidity and metal modification of HZSM-5", Fuel, (2018) 223, 211-221.
Li, Q., He, P., Jarvis, J., Bhattacharya, A., Mao, X., Wang, A., Bernard, G., Michaelis, V., Zeng, H., Liu, L., Song, H.*, "Catalytic co-aromatization of methane and heptane as an alkane model compound over Zn—Ga/ZSM-5: A mechanistic study", Applied Catalysis B: Environmental, (2018) 236, 13-24.
Lou, Y., He, P., Zhao, L., Song, H.*, "Highly Selective Olefin Hydrogenation: Refinery Oil Upgrading over Bifunctional PdOx/H-ZSM-5 Catalyst", Catalysis Communications, (2016) 87, 66-69.
Meng, S., Wang, A., He, P., Song, H.*, "Non-thermal plasma assisted photocatalytic conversion of simulated natural gas for high quality gasoline production near ambient conditions", The Journal of Physical Chemistry Letters, (2020), 11, 3877-3881.
Shen, Z., He, P., Wang, A., Harrhy, J., Meng, S., Peng, H., Song, H.*, "Conversion of naphthalene as model compound of polyaromatics to mono-aromatic hydrocarbons under the mixed hydrogen and methane atmosphere", Fuel (2019) 243, 469-477.
Shen, Z., Ke, M., Lan, L., He, P., Liang, S., Zhang, J., Song, H.*, "Active phases and reaction performance of Mo improved Ni/Al2O3 catalysts for thioetherification", Fuel, (2019) 236, 525-534.
Chen, G., Yuan, W., Wu, Y., Zhang, J., Song, H., Jeje, A., Song, S., Qu, C., "Catalytic aquathermolysis of heavy oil by coordination complex at relatively low temperature", Petroleum Chemistry, (2017) 57 (10), 881-884.
Sun, X., He, P., Gao, Z., Liao, Y., Weng, S., Zhao, Z., Song, H.*, Zhao, Z.*, "Multi-Crystalline N-doped Cu/CuxO/C Foam Catalyst Derived from Alkaline N-coordinated HKUST-1/CMC for Enhanced 4-Nitrophenol Reduction", Journal of Colloid and Interface Science, (2019), 553, 1-13.

Wang, A., Harrhy, J., Meng, S., He, P., Liu, L., Song, H.*, "Nonthermal Plasma-Catalytic Conversion of Biogas to Liquid Chemicals with Low Coke Formation", Energy Conversion & Management, (2019), 191, 93-101.
Wang, A., Meng, S., Song, H.*, "Non-thermal plasma induced photocatalytic conversion of light alkanes into high value-added liquid chemicals at near ambient conditions", Chemical Communications, (2020), 56, 5263-5266.
Lou, Y., He, P., Zhao, L., Cheng, W., Song, H.*, "Olefin Upgrading over Ir/ZSM-5 catalysts under methane environment", Applied Catalysis B: Environmental , (2017) 201, 278-289.
He, P., Lou, Y., Song, H.*, "Olefin Upgrading under Methane Environment over Ag—Ga/ZSM-5 Catalyst", Fuel, (2016), 182, 577-587.
Xu, H., Li, Z., Pryde, R., Meng, S., Li, Y., Song, H.*, "Participation of methane in economically and environmentally favorable catalytic asphaltene upgrading process", Chemical Communications, (2020), 56, 5492-5495.
Jarvis, J., He, P., Wang, A., Song, H.*, "Pt—Zn/HZSM-5 as a Highly Selective Catalyst for the Co-aromatization of Methane and Light Straight Run Naphtha", Fuel (2019) 236, 1301-1310.
Lou, Y., He, P., Zhao, L., Song, H.*, "Refinery Oil Upgrading under Methane Environment over PdOx/H-ZSM-5: Highly Selective Olefin Cyclization", Fuel , (2016) 183, 396-404.
He, P., Wen, Y., Jarvis, J., Gatip, R., Austin, D., Song, H.*, "Selective Participation of Methane in Olefin Upgrading over Pd/ZSM-5 and Ir/ZSM-5: Investigation using Deuterium Enriched Methane", ChemistrySelect, (2017) 2, 252-256.
Guo, A., Wei, Z., Zhao, B., Chen K., Liu, D., Wang, Z., Song, H.*, "Separation of Toluene-Insoluble Solids in the Slurry Oil from a Residual Fluidized Catalytic Cracking Unit: Determination of the Solid Content and Sequential Selective Separation of Solid Components", Energy & Fuels, (2014) 28 (5), 3053-3065.
Notification of Transmittal of International Search Report & Written Opinion including International Search Report & Written Opinion for International Application No. PCT/IB2021/057564, dated Nov. 29, 2021, 14 pages.
Notification of Transmittal of International Search Report & Written Opinion including International Search Report & Written Opinion for International Application No. PCT/IB2021/057565, dated Nov. 10, 2021, 15 pages.
Notification of Transmittal of International Search Report & Written Opinion including International Search Report & Written Opinion for International Application No. PCT/IB2021/057789, dated Aug. 25, 2021, 13 pages.
Official Action for Eurasian Patent Application No. 202192284 issued by the Eurasian Patent Office dated Mar. 30, 2022 with English translation, 20 pages.
Xu et al., Communications Chemistry, vol. 4, epub. Mar. 11, 2021, Article 34.
Aboul-Gheit et al., Journal of Molecular Catalysis A: Chemical, vol. 245, 2006, epub. Nov. 7, 2005, pp. 167-177.
Juybar, M. et al., "Conversion of methanol to aromatics over ZSM-5/11 intergrowth Zeolites and bimetallic Zn—Cu—ZSM-5/11 and Ga—Ag—ZSM-5/11 catalysts prepared with direct synthesis method", J. Chem. Sei. (attached to the Notification) (D1, section "2.1 Material and methods", tab. 1).
He, Peng et al., Catalytic Conversion of Biomass by Natural Gas for Oil Quality Upgrading, Sep. 22, 2014, available at https://doi.org/10.1021/ie502272j.

* cited by examiner

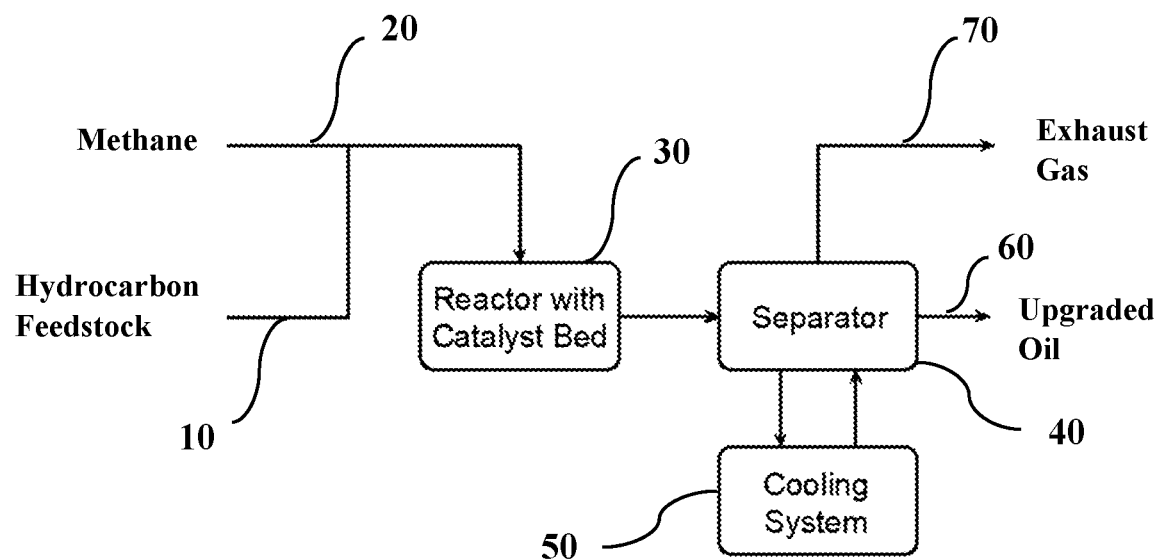

CATALYST STRUCTURE AND METHOD OF UPGRADING HYDROCARBONS IN THE PRESENCE OF THE CATALYST STRUCTURE

CROSS-REFERENCE TO RELATED APPLICATION

This application claims priority from U.S. Provisional Patent Application Ser. No. 62/807,795, filed Feb. 20, 2019, the disclosure of which is incorporated herein by reference in its entirety.

FIELD

The present invention is directed toward the formulation of a heterogeneous catalyst and a process of utilizing the catalyst in the upgrading of hydrocarbons in a mixed gas environment for improving the quality of such hydrocarbons while also producing aromatic hydrocarbons.

BACKGROUND

Demand for hydrogen will increase in the upcoming years as a result of stricter environmental legislation relating to the processing of hydrocarbons, including petroleum, natural gas, coal, bitumen, refined products, and bio-oils. Not only legislation but more extensive processing of residues and higher diesel demand compared with petrol will also increase hydrogen's demand.

There are various hydrotreating processes associated with upgrading and refining of hydrocarbons, including: upgrading and hydrocracking (long-chain hydrocarbons are cracked to shorter chains); hydrodesulphurization (sulphur compounds are hydrogenated to hydrogen sulphide $H_2S$); hydroisomerisation (normal paraffins are converted into iso-paraffins to improve the product properties, e.g. RON); and dearomatisation (aromatics are hydrogenated to cyclo paraffins or alkanes).

Hydrogen volumes that are consumed increasingly exceed those produced in a platformer and have to be supplemented by other sources, all of which produce significant amounts of $CO_2$. Some examples of processes for hydrogen on-site supply include steam reforming of methane or other hydrocarbons, recovery from refinery off-gases, recovery from syngas, and gasification of oil refining residues.

Significant effort has been applied to providing a suitable and energy efficient process for upgrading hydrocarbons by conversion of saturated components in the hydrocarbons to more valuable chemicals. For example, the upgrading of a heavy oil involves the breaking or cracking of large hydrocarbon molecules within the heavy oil into smaller molecules under certain conditions. In particular, bitumen derived feedstock heavy oil can be upgraded by cracking the larger hydrocarbon molecules into smaller, more desirable compounds such as benzenes, toluenes and xylenes (BTX) components. During the cracking/reaction process, undesired feedstock molecules (e.g., asphaltene contents) are converted to more volatile and other desirable molecules in addition to BTX components, such as octane and other gasoline or petroleum products as well as simpler (e.g., mono) aromatic compounds. Certain atoms, such as sulfur and nitrogen, can also be removed to improve the quality of the final oil product.

A conventional approach to upgrade hydrocarbons is a thermal cracking process, which produces the desired components along with an undesirable amount of coke and $CO_2$. Thermal cracking is typically followed with hydrotreating of the cracked components using hydrogen gas, typically obtained by an energy intensive process of steam reforming of natural gas (thus increasing the cost of the hydrotreating process). Another conventional process for upgrading heavy oil is by treating with $H_2$ gas in the presence of a heterogenous catalyst to achieve catalytic hydrocracking of the heavier hydrocarbons. Hydrotreating catalysts typically include high surface area supports such as $Al_2O_3$ typically doped with nickel, molybdenum, and noble group metals such as platinum (Pt) and rhenium (Re). Such hydrotreating steps are costly and inefficient due to the high temperature (e.g., about 800° C. or greater) and high pressure (e.g., about –100-200 atm) operating conditions required to achieve satisfactory levels of upgrading (e.g., viscosity reduction and hydrogen incorporation).

In view of the foregoing, it would be advantageous to provide a process that is more energy efficient, environmentally efficient, reduces GHG (greenhouse gas) emissions, and less expensive for processing hydrocarbons to produce a desired final product.

BRIEF SUMMARY

In accordance with embodiments described herein, a catalyst structure comprises a porous support structure comprising an aluminum oxide material (e.g., $Al_2O_3$), an aluminosilicate material, or a zirconium oxide material (e.g., $ZrO_2$), and any two or more metals loaded in the porous support structure, the two or more metals selected from the group consisting of Ga, Ag, Mo, Zn, Co and Ce. Each metal is loaded in the porous support structure is present in an amount from about 0.1 wt % to about 20 wt %.

In other embodiments, a process of forming the catalyst structure is provided. Further, a method of upgrading hydrocarbons in the presence of the catalyst structure is described herein.

The above and still further features and advantages of the present invention will become apparent upon consideration of the following detailed description of specific embodiments thereof.

BRIEF DESCRIPTION OF THE DRAWINGS

FIG. 1 depicts a reaction system for upgrading heavy oil utilizing a catalyst structure and in a methane, $N_2$ or $H_2$ environment in accordance with example embodiments described herein.

Like reference numerals have been used to identify like elements throughout this disclosure.

DETAILED DESCRIPTION

In the following detailed description, while aspects of the disclosure are disclosed, alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

In accordance with example embodiments, catalyst structures are described herein for use in combination with processes for upgrading a first hydrocarbon product utilizing methane and one or more of such catalyst structures to achieve a higher quality product including smaller, more desirable molecules (e.g., BTX components) as well as other desired physical properties for the final or second, upgraded hydrocarbon product (e.g., a desired viscosity, a desired total acid number or density, etc.).

The use of methane, rather than hydrogen alone, in the hydrocarbon upgrading process obviates the need for a hydrotreating step at high pressures and temperatures. Instead, the hydrocarbon can be converted to aromatic or paraffinic products via a multi-step mechanism consisting of cracking, oligomerization, cyclization and hydrogen transfer steps. However, the design of the catalyst so as to activate methane and the hydrocarbon substrate and selectively form desired products is very important to the efficacy of hydrocarbon upgrading. The catalyst structures described herein facilitate the upgrading of hydrocarbons in the presence of methane and at much lower temperatures and pressures than those typically required when utilizing a hydrotreating process. For example, methane can be converted at lower temperatures (e.g., in the range of 300–600° C.) and at lower pressures (e.g., about 1-200 atm, such as about 1-50 atm) when combined with hydrocarbon molecules in the presence of a catalyst structure as described herein.

Types of Hydrocarbons for Upgrading

As used herein, the term "hydrocarbon" or "hydrocarbon product" refers to any type of hydrocarbon material in a solid, semi-solid (e.g., slurry or gel like state) and/or liquid that can be processed as described herein to from a final, upgraded product having one or more desirable properties and/or characteristics for a particular use or purpose. In other words, a first hydrocarbon product (e.g., a raw or intermediate processed hyrdocarbon product) is subjected to an upgrading process as described herein to obtain a second (final) hydrocarbon product having one or more enhanced properties and/or characteristics.

Types of hydrocarbon products that can be subjected to upgrading include, without limitation the following:

Crude oil, which can be categorized as follows:
light crude oil (or light oil)—crude oil having an API gravity of 31.1° API or higher. The light crude oils generally have a dynamic viscosity less than $2 \times 10^3$ cP (mPa·s). Types of light crude oils can be further categorized into very light oils including, without limitation, jet fuel, diesel fuel, gasoline, kerosene, petroleum ether, petroleum spirit, and petroleum naphtha.

medium crude oil (or medium oil)—crude oil having an API gravity ranging between 22.3° API and 31.1° API. Medium crude oils typically have a higher viscosity in relation to light crude oils, the dynamic viscosity is often within the range of $2 \times 10^3$-$2 \times 10^4$ cP (mPa·s).

heavy crude oil (or heavy oil)—crude oil having an API gravity ranging between 10° API and 22.2° API. Heavy crude oils typically have a higher viscosity in relation to medium crude oils. In particular, a heavy crude oil can have a dynamic viscosity of at least about $1 \times 10^5$ cP (mPa·s). Heavy crude oil also includes extra heavy oil or bitumen. For example, bitumen (which can be obtained, e.g., in Alberta, Canada) often has an average density of 1.0077 g/cm$^3$, an API gravity of 8.9° API, and a dynamic viscosity of $2 \times 10^4$-$2 \times 10^6$ cP (mPa·s) at atmospheric conditions. Other types of heavy oil include bunker fuel and residual oil or resid (i.e., fuel oil remaining after removal of certain distillates, such as gasoline, from petroleum).

Synthetic fuel oils, including, without limitation:
synthetic oils created using a Fischer-Tropsch (F-T) process.
bio oils (or pyrolysis oils) created from biomass (e.g., wood, algae, etc.) and utilizing a pyrolysis process.

In addition, hydrocarbon products can also be categorized based upon further properties, such as whether or not the hydrocarbon product has been sweetened. For example, a hydrocarbon product (e.g., heavy, medium or light oil) can be sweetened (containing sulfur in an amount less than 0.42% by volume) or unsweetened or sour (containing sulfur in an amount greater than 0.50%).

The upgrading process of the hydrocarbon products results in a change in one or more properties in the hydrocarbon products. The change (from first hydrocarbon product to upgraded, second hydrocarbon product) to one or more properties in the hydrocarbon product include, without limitation, change (decrease) in density, change (decrease) in viscosity, change (decrease) in sulfur content, change (decrease) in TAN (total acid number), change (decrease) in an amount (e.g., weight percentage) of olefins, change (decrease) in an amount (e.g., weight percentage) of nitrogen, change (decrease) in pour point, change (increase) in an amount (e.g., weight percentage) of one or more aromatic hydrocarbons, change (increase) in the hydrogen to carbon ratio (H/C ratio), and change (increase) in cetane number.

Catalyst Structures

In accordance with the present invention, a catalyst structure is provided that comprises an acidic mono or multi-metallic (e.g., bimetallic), highly porous structure for converting or upgrading hydrocarbons in a methane environment. It is noted that the catalyst structures described herein can also be used to upgrade heavy oil in a $H_2$ or $N_2$ environment, although utilizing a methane gas environment is preferred. In further embodiments, a feed including methane combined with $N_2$ and/or $H_2$ can be provided for the hydrocarbon upgrading process. The upgraded oil product has a lower viscosity in relation to the heavy oil, a lower density in relation to the heavy oil, a decrease in total acid number (TAN) in relation to the heavy oil, and an increase in content of lighter hydrocarbons such as aromatics and paraffins in relation to the heavy oil.

The catalyst structure can be synthesized by impregnating or doping a suitable support material with two or more metals (e.g., utilizing process such as wet impregnation or ion exchange to adsorb metal ions to the porous surfaces of the support material). A suitably porous support material can be an aluminum oxide material (e.g., $Al_2O_3$), an aluminosilicate (zeolite) material, or a zirconium oxide material (e.g., $ZrO_2$). Some non-limiting examples of a suitable zeolite material for use as a support material for the catalyst structure include a ZSM-5 type zeolite (e.g., HZSM-5 zeolite, NaZSM-5 zeolite, etc.), A-type zeolite, L-type zeolite, HY type zeolite and a zeolite structure commercially available from Rive Technology (Monmouth Junction, N.J.). An ammonium type zeolite can also be utilized by conversion to a hydrogen type zeolite (e.g., by calcination in static air at a temperature of about 400-600° C. for a period of about 4-6 hours). When utilizing a zeolite material as the support material, a $SiO_2$ to $Al_2O_3$ ratio of the zeolite support material can be in the range of 1-280 (i.e., a ratio of $SiO_2$ to $Al_2O_3$ that is 1:1 to 280:1), such as a range of 5-28, or a range of 23-280. The zeolite material can further have a BET surface area in the range from 350 $m^2/g$ and 950 $m^2/g$. The support materials can optionally be modified with phosphorus prior to being synthesized into a suitable catalyst structure.

Suitable metals that can be used to dope the porous support material include any one or more (and preferably any two or more) of gallium (Ga), silver (Ag), zinc (Zn), molybdenum (Mo), cobalt (Co) and cerium (Ce). Each metal dopant or the combination of metal dopants can be provided within the catalyst structure (e.g., in metal or metal oxide form) in an amount ranging from 0.1-20 wt %. For certain metals, such as Ag and Ga, the preferred metal loading is from 0.2-2 wt %. For other metals, such as Co, the preferred metal loading is 0.3-3 wt %. Specific examples are provided herein of different metal loadings for catalyst structures. It is noted that the term weight percentage (wt %) of a metal within a catalyst structure, as described herein, refers to the mass of a particular metal element divided by the mass of the catalyst support (i.e., the mass of the porous catalyst support material prior to metal loading) and then multiplied by 100 (to obtain a percentage value).

The porous support material can be doped with a suitable amount of one or more metals in the following manner. One or more metal salts can be dissolved in deionized water to form an aqueous solution of one or more metal precursors at suitable concentration(s) within solution. Metal precursor salts that can be used to form the catalyst structure include, without limitation, chlorides, nitrates and sulfates. The one or more metal precursors in solution are then loaded into the porous support material to achieve a desired amount of metals within the catalyst structure (e.g., from 0.1-20 wt %). Any suitable loading process can be performed to load metals within the porous support material. Some non-limiting examples of metal loading processes include: IWI (incipient wetness impregnation, where an active metal precursor is first dissolved in an aqueous or organic solution, the metal-containing solution is then added to a catalyst support containing the same pore volume as the added solution volume, where capillary action draws the solution into the pores); WI (wet impregnation, where more liquid than the IWI volume is added to the support, and the solvent is then removed by evaporation); IE (ion-exchange, where metal cations are exchanged into the support from solution); and FI (framework incorporation, where metals are added to the support materials during the synthesis step of the support).

Depending upon the particular loading process, the resultant metal loaded catalyst structure can be dried at a temperature between about 80° C. to about 120° C. for a period of time between about 2 hours to about 24 hours. The dried catalyst structure can then be subjected to calcination under air, $N_2$ or another gas or reduction under $H_2$ at a temperature ranging from about 300-700° C. and at a suitable ramped or stepped increased heating rate (e.g., heating rate increases the temperature at about 5-20° C./min), where such calcination temperatures, times and heating rates can be modified depending upon the type or types of metals doped into the catalyst structure as well as reaction conditions associated with use of the catalyst structure.

The resultant metal doped catalyst structure is suitable for use in hydrocarbon upgrading under a methane (or $H_2$ or $N_2$) environment in processes as described herein. The catalyst structure can be processed into a granular form having a granule size as desired for a particular operation. Some examples of granular sizes include a diameter (or cross-sectional dimension) range that is 1-5 mm, and a lengthwise or longitudinal dimension range that is 5-10 mm. The catalyst structure can also be formed into any other suitable configuration.

For example, the catalyst structure can also be converted into pellets, e.g., by combining the powder into pellets using a suitable binder material. For example, the catalyst structure in powder form can be mixed with colloidal silica, methyl cellulose and a solution of an acid such as acetic acid or citric acid, where the mixture can then be extruded to form pellets. The weight ratios between catalyst powder and colloidal silica, between catalyst powder and methyl cellulose, and between catalyst powder and acetic acid or citric acid solution can range from 1:0.5-2, 1:0.05-0.2 and 1:0.1-0.5, respectively. The mass concentration of acetic acid or citric acid solution can be about 10-50 wt. %. Some non-limiting examples of colloidal silica used to form the pellets include LUDOX® AM-30 and LUDOX® HS-40. In forming the pellets, the components can be added into the catalyst powder in the following order: methyl cellulose, acetic or citric acid solution and colloidal silica. In a first step, the pellet is prepared by well mixing (e.g., using a suitable mixer) of the catalyst powder and methyl cellulose The acetic or citric acid solution is prepared and then combined with the catalyst mixture and the contents well mixed, followed next by the addition of colloidal silica and then further mixing. Next, the combined mixture is extruded using a suitable extruder at about room temperature (e.g., about 20-25° C.). To control the shape and size of catalyst pellets, the extruder is equipped with a suitable forming die. In example embodiments, a catalyst pellet can have a cylindrical shape that is about 0.5-3 mm in length and/or diameter. After extrusion, the catalyst pellet can be dried at about 80-100° C. for about 8-12 hours, followed by calcination at 550° C. for about 12 hours (e.g., utilizing a heating rate that increases temperature in an amount ranging from about about 5-20° C./min).

The catalyst structure in a powder form can be utilized, e.g., in a batch reactor system, while the catalyst structure in a pelleted form can be utilized in a continuous flow system. Catalyst structures as described herein can further be used for heavy oil upgrading in a number of different types of reactor systems including, without limitation, batch reactor systems, continuous tubular reactors (CTR), continuous stirred-tank reactors (CSTR), semi batch reactors, varying catalytic reactors such as fixed bed, trickle-bed, moving bed, rotating bed, fluidized bed, slurry reactors, a non-thermal plasma reactor, and any combinations thereof.

In addition, the catalyst structure can be regenerated, either before or after a period of time of its use in upgrading hydrocarbons, to enhanced the performance of the catalyst structure. The regeneration process comprises rinsing the catalyst with toluene, drying in air to remove toluene (e.g., drying at 100-200° C., e.g., about 150° C., for at least 1 hour, e.g., about 3 hours or greater) and calcination (heating in air) at a temperature of at least about 500° C. (e.g., about 600° C. or greater) for a sufficient period of time, e.g., at least about 3 hours (e.g., about 5 hours or greater). The regeneration process can also be repeated any number of times and depending upon a particular application. For a catalyst structure that has been used to upgrade hydrocarbons, the regeneration process (e.g., single regeneration, twice regeneration, etc.) can be used to regenerate or refresh the catalyst structure such that its performance in upgrading hydrocarbons is enhanced in relation to the performance of the catalyst structure prior to the regeneration process. In particular, the performance of the catalytic reaction for the catalyst structure can improve when subjected to a regeneration process and after the catalyst structure has been used in long-term industrial applications. While not bound by any particular theory, it would appear that the active catalytic sites in the catalysts are further activated during the regeneration process. In particular, the metal oxides may be converted to sulfides during the reaction and better disperse in the catalyst structure. In the regeneration process, metal migration may take place to achieve a better dispersion, resulting in improved catalytic performance. The improved catalytic performance upon regeneration of the catalysts described herein renders these catalysts highly suitable for commercial applications in the upgrading of oil (or other hydrocarbon) feedstocks in a methane (or $H_2$ or $N_2$) environment. Further, the regeneration process can be repeated a plurality of times (e.g., regenerated twice, regenerated three times, etc.) for a particular application to enhance the catalytic performance of the catalyst structure.

Some examples of forming catalyst structures in accordance with the present invention are now described in the following examples.

Example 1

A 1 wt. % Ag-1 wt. % Ga/HZSM-5(23:1) catalyst structure was prepared in the following manner. An ammonium type ZSM-5 ($NH_4$-ZSM-5, $SiO_2$:$Al_2O_3$ molar ratio of 23:1) support structure in powder form and commercially available from Zeolyst USA was calcined in static air at 600° C. for 3 hours. The following metal salts were dissolved in deionized water to form a metal precursor solution: 0.13 g $AgNO_3$ and 0.30 g $Ga(NO_3)_3.9H_2O$ (where the mass of water used to prepare the solution is about the same as the mass of the support structure). The HZSM-5 support was impregnated with the metal precursor to achieve a suitable metal weight loading. The obtained wet powder was first dried in an oven at 92° C. overnight, followed by calcination at 550° C. in static air.

The catalyst powder was then converted to a pellet form as follows. The catalyst power was mixed with methyl cellulose, colloidal silica and the citric acid solution according to the following procedures: 1 wt. % Ag-1 wt. % Ga/HZSM-5 (23:1) catalyst was first mixed with methyl cellulose in a mass ratio of catalyst:methyl cellulose of 1:0.1; next, a citric acid solution is added in a mass ratio of catalyst:citric acid solution=1:0.3, where the mass concentration of citric acid solution was 20 wt. %; next, colloidal silica (LUDOX® AM-30) was also added as the binder in a mass ratio of 1:1. After all components were added and suitably mixed, the extrusion was conducted with an extruder at room temperature. After extrusion, the wet catalyst pellets were dried at 80° C. overnight (e.g., about 8-12 hours), followed by calcination at 550° C. for 12 hours.

The 1 wt. % Ag-1 wt. % Ga/HZSM-5(23:1) catalyst structure pellets were regenerated twice before being tested in a hydrocarbon upgrading process. Each regeneration process is carried out by rinsing the catalyst with toluene, drying in air to remove toluene at 150° C. for 3 hours and calcination (heating in air) at 600° C. for 5 hours.

A heavy oil feedstock sample with a viscosity of $1.12 \times 10^5$ mPa·s at 15.6° C. was used as the feedstock for the test. The catalyst pellets were loaded in a continuous flow reactor. The reaction was carried out continuously over a period of about 1 week and under 10.0 MPa in methane and at 410° C., where the flow rate of feedstock was set so that the weight hour space velocity (WHSV) was 1 $h^{-1}$. During the process, use of the catalyst structure resulted in a reduction in viscosity of the processed oil sample to 325 mPa·s, where a 106.3 wt. % mass liquid yield was achieved after reaction. The liquid yield was determined as follows:

$$\text{Liquid yield} = \frac{\text{Weight of collected liquid product}}{\text{Weight of consumed heavy crude}} \times 100\%$$

The coke formation rate is calculated by following equation:

$$\text{Coke formation rate} = \frac{\text{The weight of coke on catalyst (The decreased weight after calcination)}}{\text{The weight of catalyst after calcination} \times \text{Reaction time}} \times 100\%$$

Asphaltene content in the feedstock was reduced from 13.21 wt. % to 5.23 wt. %, resulting in greatly increased light end products (as set forth in Table 1 below). Good stability of the oil product was also witnessed after the reaction, where the Peptization value or P-value of the product oil was 2.42 (indicating that the product oil is stable enough for pipeline transportation as well as the downstream refinery).

Example 2

A 1 wt. % Ag-1 wt. % Ga-5 wt. % Mo-10 wt. % Ce/HZSM-5(23:1) catalyst was prepared in the following manner. A $NH_4$-ZSM-5 ($SiO_2$:$Al_2O_3$ molar ratio of 23:1) support structure in powder form and obtained from Zeolyst USA was calcined in static air at 600° C. for 3 hours. The following metal salts were dissolved in deionized water to form a metal precursor solution:$Ce(NO_3)_3.6H_2O$, $(NH_4)_6Mo_7O_{24}.4H_2O$, $Ga(NO_3)_3.9H_2O$ and $AgNO_3$. The HZSM-5 support was impregnated with the metal precursor solution to achieve a suitable metal weight loading. The obtained wet powder was first dried in an oven at 92° C. overnight, followed by calcination at 550° C. in static air.

The catalyst powder was then converted to a pellet form as follows. The catalyst power was mixed with methyl cellulose, colloidal silica and the citric acid solution according to the following procedures: the 1 wt. % Ag-1 wt. % Ga-5 wt. % Mo-10 wt. % Ce/HZSM-5(23:1) catalyst was first mixed with methyl cellulose in a mass ratio of catalyst:methyl cellulose of 1:0.15; next, a citric acid solution is added in a mass ratio of catalyst:citric acid solution=1:0.2, where the mass concentration of citric acid solution was 30 wt. %; next, colloidal silica (LUDOX® HS-40) was also added as the binder in a mass ratio of 1:1. After all components were added and suitably mixed, the extrusion was conducted with an extruder at room temperature. After extrusion, the wet catalyst pellets were dried at 95° C. overnight (e.g., about 8-12 hours), followed by calcination at 550° C. for 12 hours.

The 1 wt. % Ag-1 wt. % Ga-5 wt. % Mo-10 wt. % Ce/HZSM-5(23:1) catalyst structure pellets were regenerated twice before being tested in a hydrocarbon upgrading process. Each regeneration process was carried out by rinsing the catalyst with toluene, drying in air to remove toluene at 150° C. for 3 hours and calcination (heating in air) at 600° C. for 5 hours.

A heavy oil (bitumen) sample with a viscosity of 641 mPa·s at 15.6° C. was used as the feedstock to test the catalyst structure. The reaction was carried out under 5.0 MPa and 400° C. in a methane environment. The weight hour space velocity was 1 h$^{-1}$. The product oil had a reduced viscosity of 340 cP, and 95.2 wt. % mass liquid yield was achieved. A significant amount of the resin and asphaltene contents in the feedstock were converted to light ends and aromatics in the product oil (see Table 1 below). The total acid number or TAN value was also reduced from 1.40 mg KOH/g in the bitumen feedstock to 0.31 mg KOH/g in the product oil. Good stability was also witnessed after the reaction.

SARA tests (measuring amounts of saturates, asphaltenes, resins, and aromatics in the oil product) were conducted for the oil products obtained in Examples 1 and 2 and utilizing the catalyst structures prepared in those tests. The test results are provided in Table 1:

TABLE 1

SARA Test Results for Product Oil of Examples 1 and 2

| SARA Components | Example 1 | | Example 2 | |
| --- | --- | --- | --- | --- |
| | Feedstock (wt %) | Oil Product (wt %) | Feedstock (wt %) | Oil Product (wt %) |
| Light End | 2.93 | 20.57 | 6.1 | 16.3 |
| Saturates | 22.32 | 20.28 | 18.6 | 19.6 |
| Aromatics | 39.89 | 33.03 | 30.2 | 38.4 |
| Resins | 19.50 | 19.74 | 28.2 | 19.0 |
| Asphaltenes | 13.21 | 5.23 | 16.9 | 6.7 |

Other catalyst structures with different combinations of metal dopants and/or different catalyst supports can also be formed in accordance with the present invention, where the method of forming such catalyst structures can be the same or similar to that described herein. Example 3 provides a further example of a catalyst structure.

Example 3

A catalyst structure with the formula of 1% Ag-1% Ga-2% Co-6% Mo-10% Ce/HZSM-5(23:1) was prepared in the following manner. A NH$_4$-ZSM-5 (SiO$_2$:Al$_2$O$_3$ molar ratio of 23:1) support structure in powder form and obtained from Zeolyst USA was calcined in static air at 600° C. for 3 hours. The following metal salts were dissolved in deionized water to form a metal precursor solution: Ce(NO$_3$)$_3$·6H$_2$O, (NH$_4$)$_6$Mo$_7$O$_{24}$·4H$_2$O, Co(NO$_3$)$_2$·6H$_2$O, Ga(NO$_3$)$_3$·9H$_2$O and AgNO$_3$. The mass of water used to prepare each precursor solution equals to the mass of the ZSM-5 support. The HZSM-5 support was impregnated with the metal precursor solution to achieve a suitable metal weight loading. The obtained wet powder was first dried in an oven at 92° C. overnight, followed by calcination at 550° C. in static air.

A series of experiments were performed to evaluate the reaction performance of different catalysts formed according to methods as described herein, where the catalysts were utilized in a process to upgrade different feedstocks of heavy oil (or other hydrocarbon product) under different conditions. Table 2 provides a list of various catalysts formed in accordance with the methods described herein, including a listing of operating temperature and pressure conditions in a reactor that included the catalyst, and the final (oil product) viscosity and liquid yield of a heavy oil subjected to upgrading in the presence of methane and the particular catalyst in the reactor.

TABLE 2

Performance of Catalyst Structures

| Catalyst Number | Catalyst | Temp (° C.) | Pressure (MPa) | Viscosity of Oil Product (mPa · s) | Liquid yield (%) |
| --- | --- | --- | --- | --- | --- |
| 1 | 1 wt. % Ag-1 wt. % Ga/HZSM-5(23:1) | 400 | 6 | 6374 | 92.4 |
| 2 | 1 wt. % Ag-1 wt. % Ga/HZSM-5(23:1) | 400 | 10 | 9232 | 104.1 |
| 3 | 1 wt. % Ag-1 wt. % Ga/HZSM-5(23:1) | 420 | 8 | 37 | 89.4 |
| 4 | 1 wt. % Ag-1 wt. % Ga/HZSM-5(23:1), regenerated | 400 | 5 | 473 | 106.1 |
| 5 | 1 wt. % Ag-1 wt. % Ga/HZSM-5(23:1), regenerated twice | 400 | 5 | 286 | 108.6 |
| 6 | 1 wt. % Ag-1 wt. % Ga-5 wt. % Mo-10 wt. % Ce/HZSM-5(23:1) | 400 | 5 | 985 | 92.6 |
| 7 | 1 wt. % Ag-1 wt. % Ga-5 wt. % Mo-10 wt. % Ce/HZSM-5(23:1), regenerated | 400 | 5 | 205 | 108.8 |

TABLE 2-continued

Performance of Catalyst Structures

| Catalyst Number | Catalyst | Temp (° C.) | Pressure (MPa) | Viscosity of Oil Product (mPa · s) | Liquid yield (%) |
|---|---|---|---|---|---|
| 8 | 1 wt. % Ag-1 wt. % Ga/HZSM-5(23:1), regenerated twice | 410 | 10 | 179 | 102.9 |
| 9 | 1 wt. % Ag-1 wt. % Ga/HZSM-5(23:1), regenerated twice | 420 | 10 | 42 | 99.9 |
| 10 | 1 wt. % Ag-1 wt. % Ga-2 wt. % Co-6 wt. % Mo-10 wt. % Ce/HZSM-5(23:1) | 400 | 3 | 177 | 97 |
| 11 | 1 wt. % Ag-1 wt. % Ga-5 wt. % Mo-l0 wt. % Ce/HZSM-5(23:1) | 400 | 3 | 274 | 98 |
| 12 | 1 wt. % Ag-1 wt. % Ga-5 wt. % Mo-10 wt. % Ce/HZSM-5(23:1), sulfide | 400 | 3 | 164 | 98 |
| 13 | 1 wt. % Ag-1 wt. % Ga-2 wt. % Co-6 wt. % Mo-10 wt. % Ce/HZSM-5(23:1) | 400 | 3 | 174 | 98 |
| 14 | 1 wt. % Ag-1 wt. % Ga-2 wt. Co-6 wt. % Mo-10 wt. % Ce/HZSM-5(23:1) | 400 | 3 | 488 | 99 |
| 15 | 1 wt. % Ag-1 wt. % Ga-2 wt. % Co-6 wt. % Mo-10 wt. % Ce/HZSM-5(23:1), sulfide | 400 | 3 | 143 | 98 |
| 16 | 1 wt. % Ag-1 wt. % Ga/Zeolite A (1:1) | 400 | 3 | 103 | 97.2 |
| 17 | 1 wt. % Ag-1 wt. % Ga/ZSM-5(280:1) | 400 | 3 | 67 | 94.7 |
| 18 | 1 wt. % Ag-1 wt. % Ga-5 wt. % Mo-10 wt. % Ce/HZSM-5(23:1) | 500 | 0.1 | 3 | 48.8 |
| 19 | 1 wt. % Ag-1 wt. % Ga-5 wt. % Mo-10 wt. % Ce/HZSM-5(23:1) | 300 | 10 | 118 | 95.8 |
| 20 | 1 wt. % Ag-1 wt. % Ga-5 wt. % Mo-10 wt. % Ce/HZSM-5(23:1) | 400 | 3 | 1198 | 98.9 |
| 21 | 1 wt. % Ag-1 wt. % Ga-5 wt. % Mo-10 wt. % Ce/HZSM-5(23:1) | 400 | 3 | 959 | 95.2 |
| 22 | 1 wt. % Ag-1 wt. % Ga-5 wt. % Mo-10 wt. % Ce/HZSM-5(23:1) | 400 | 3 | 3927 | 96.2 |
| 23 | 1 wt. % Ag-1 wt. % Ga-5 wt. % Mo-10 wt. % Ce/HZSM-5(23:1) | 400 | 3 | 694 | 99.9 |
| 24 | 1 wt. % Ag-1 wt. % Ga-5 wt. % Mo-10 wt. % Ce/HZSM-5(23:1) | 400 | 3 | 25.6 | 100.2 |
| 25 | 1 wt. % Ag-1 wt. % Ga-5 wt. % Mo-10 wt. % Ce/HZSM-5(23:1) | 400 | 3 | 98 | 99.0 |
| 26 | 1 wt. % Ag-1 wt. % Ga-5 wt. % Mo-10 wt. % Ce/HZSM-5(23:1) | 400 | 3 | 10 | 90.1 |
| 27 | 1 wt. % Ag-1 wt. % Ga-5 wt. % Mo-10 wt. % Ce/HZSM-5(23:1) | 420 | 5 | 119 | 103.0 |
| 28 | 1 wt. % Ag-1 wt. % Ga-5 wt. % Mo-10 wt. % Ce/HZSM-5(23:1) | 420 | 10 | 42 | 100.0 |

The reactions for the catalysts in Table 2 varied as follows. For Catalysts 1-9, the experimental reactions were performed in a continuous flow reactor having a liquid hour space velocity (LHSV) of 1 h$^{-1}$ and the gas phase was $CH_4$. The reaction processes were similar to the processes described herein in Examples 4 and 5. For Catalysts 1-3, the heavy oil sample had a viscosity of $1.12 \times 10^5$ mPa·s at 15.6° C.; for Catalysts 4-7, the heavy oil sample had a viscosity of 641 mPa·s at 15.6° C.; for Catalysts 8 and 9, a heavy oil sample had a viscosity of 1911 mPa·s at 15.6° C. The LHSV was 1 h$^1$ and the gas phase was $CH_4$ for the reactions associated with Catalysts 1-9.

For Catalysts 10-15, the experimental reactions were performed in a 300 mL batch reactor, and the mass ratio between the heavy oil feedstock and the catalyst was 100:1. In a typical reaction, 60 grams of heavy oil feedstock with certain amount of catalyst (e.g., 1 wt. %) was loaded into a Parr batch reactor of 300 mL capacity. The cylinder was pressurized with $H_2$, $CH_4$, $C_3H_8$ or their mixtures after the air inside the reactor was purged out. The autoclave was then quickly heated up to 400° C. (i.e. reaction temperature) and kept at the reaction temperature for 20-60 minutes while stirring. When the upgrading was to be terminated, the autoclave body was plunged into a cold water bath and the temperature could be lowered below 300° C. in less than 2 minutes. After being cooled to room temperature, the gas was removed from the reactor before the liquid products were collected and analyzed.

The heavy oil feedstock for Catalyst 10 had a viscosity of $1.10 \times 10^5$ mPa·s at 15.6° C. The heavy oil feedstock for Catalysts 11-15 had a viscosity of 2249 mPa·s at 15.6° C. For Catalysts 10-13, the reactor was charged with 1.5 bar $C_3H_8$ and then filled with 30 bar $CH_4$ and heated to 400° C., where it was then held for 40 min with continuous stirring. For Catalysts 14 and 15, the reactor was filled with 30 bar $H_2$ and heated to 400° C., where it was then held for 40 min with continuous stirring.

From the experimental tests performed with the catalysts as described herein, it can be seen that the performance of certain catalysts at variable life stages are different. In particular, the regenerated catalysts listed in Table 2 (Catalysts 4, 5, 7, 8 and 9) were determined to perform better than those from the original catalysts in terms of reduced product viscosity and increased liquid yield. As previously noted herein, this phenomenon shows that the performance of the catalytic reaction would improve after a regeneration process in long-term industrial applications.

Thus, the heterogeneous catalyst structures formed in accordance with the methods described herein facilitate upgrading of a hydrocarbon product (e.g., a heavy oil such as bitumen) in a methane (or $N_2$ or $H_2$) environment, yielding a product oil with a reduced viscosity as well as lighter hydrocarbons (as determined, e.g., by SARA analysis). The activated methane species participate in hydrocarbon upgrading to improve the quality and incorporate into the product molecules. A good catalytic performance in the heavy oil upgrading is also obtained under $N_2$ or $H_2$ environment. The employment of a heterogenous catalyst structure facilitates this upgrading process under milder and therefore more economical reaction conditions (e.g., lower temperatures and pressures). Furthermore, control over product selectivity is achieved through catalyst design, further increasing the commercial value of cracked distillates. Support materials with variable structure, morphology, acidity and porosity provide tunable catalytic performance of the catalysts when loaded with metal promoters to further increase catalyst effectiveness.

Systems and Methods for Upgrading Hydrocarbons Utilizing the Catalyst Structures The conversion of oil feedstocks and selectivity toward forming smaller hydrocarbon products such as aromatics and paraffins can be fine-tuned using catalyst structures as described herein and under methane, $N_2$ or $H_2$ environments. Different reactor systems and modified operating conditions (e.g., temperatures and pressures) as well as implementation of the catalyst structures within the reactor systems can also be implemented to achieve a varied level of upgrading of a first hydrocarbon product to form a second, upgraded hydrocarbon product (e.g., a lighter hydrocarbon product).

Methane is particularly useful for upgrading of heavy oil in the presence of catalysts described herein. While typically regarded as chemically inert due to its stable structure, methane activation has been a challenge in natural gas utilization. However, it has been determined that methane conversion can be significantly enhanced in the presence of higher hydrocarbon reactants (such as those in hydrocarbons, including paraffins, olefins and aromatics) and at lower temperatures.

After reaction of a first hydrocarbon product in a reaction system such as depicted in FIG. 1, and using methane and one or more catalyst structures as described herein, the quality of the hydrocarbons is upgraded such that the upgraded second hydrocarbon product emerging from the reaction system is improved based upon a change (from first hydrocarbon product to upgraded, second hydrocarbon product) in one or more properties including, without limitation, change (decrease) in density, change (decrease) in viscosity, change (decrease) in sulfur content, change (decrease) in TAN (total acid number), change (decrease) in an amount (e.g., weight percentage) of olefins, change (decrease) in an amount (e.g., weight percentage) of nitrogen, change (decrease) in pour point, change (increase) in an amount (e.g., weight percentage) of one or more aromatic hydrocarbons, change (increase) in the hydrogen to carbon ratio (H/C ratio), and change (increase) in cetane number. While methane is shown in FIG. 1 as the input gas that is combined with the heavy oil feedstock, in other embodiments the input gas could be any one of combination of methane, nitrogen and/or hydrogen.

For example, when upgrading a crude oil (e.g., a heavy oil) using a process with a catalyst structure as described herein, a change in properties between first and second (upgraded) hydrocarbon products is achieved in terms of a decrease in viscosity, a decrease in density, a decrease in total acid number (TAN), a decrease in large or heavier hydrocarbons (e.g., decrease in asphaltenes), a decrease in content or concentration of heterogeneous atoms (e.g., S and N) and an increase in content or concentration of paraffins and light aromatics including BTX. After a reaction, the viscosity can be reduced to 100-500 cP from above $1 \times 10^5$ cP, while the density can be reduced by 0.2-0.5 g/mL. The percentage of light hydrocarbons with a boiling point below 220° C. in the second hydrocarbon product can be increased by 5-30%.

An example reaction system for upgrading a hydrocarbon product utilizing methods as described herein is schematically depicted in FIG. 1. Referring to FIG. 1, a hydrocarbon feedstock line 10 (e.g., bitumen or other heavy oil) is directed along with a flow line 20 of methane (or, alternatively, $H_2$ or $N_2$) to an inlet of a reactor 30 that is operated at a suitable temperature and pressure range. For example, operating temperatures during the upgrading process and within the reactor can be controlled so as to range from about 200-500° C., such as from about 300-500° C., or from about 300-450° C. Operating pressures within the reactor can range from about 1-200 atm, or from about 1-50 atm.

A variety of different heavy oil feedstocks can also be upgraded utilizing catalyst structures and methods as described herein, where the feedstocks can have viscosities of $1 \times 10^5$ mPa·s or greater at 15.6° C. Various types of reaction systems can also be utilized, such as high pressure and high temperature batch reactor systems, continuous stirred-tank reactors (CSTRs), continuous tubular reactors (CTRs), semi batch reactors, non-thermal plasma reactors, and varying catalytic reactors (e.g., fixed bed, trickle-bed, moving bed, rotating bed, fluidized bed, as well as slurry reactors). Reactant hydrocarbon feedstock to catalyst mass ratios can be between 200:1 to 1:10 in a batch reactor system, and the heavy oil feedstock can have a liquid hourly space velocity (LHSV) and/or a weight hourly space velocity (WHSV) of about 0.1-100 $h^{-1}$, e.g., about 0.1-10 $h^{-1}$, in a flow reactor system. The gas flow (e.g., methane, $H_2$, or $N_2$) in a flow reactor system can also be se so as to have a gas hourly space velocity (GHSV) in the range of about 0.1-100 $h^{-1}$, e.g., about 0.1-10 $h^{-1}$.

In the example embodiment of FIG. 1, the reaction system includes a fixed catalyst bed reactor 30. The system further includes a separator 40, an oil pump (not shown) to deliver the heavy raw oil from a crude oil tank to the reactor 30, a product tank (not shown) for storing the upgraded oil product, and a cooling system 50 to cool the products emerging from the reactor. The raw oil can be preheated to 80° C. in the crude oil tank. The preheated crude oil feedstock line 10 is mixed with the high pressure methane provided from line 20 (methane at room temperature and 10 MPa) before entering into the reactor 30. With the presence of the catalyst structure within the fixed bed reactor 30, methane will be further activated and react with the crude oil within the reactor. The choice of a particular catalyst structure can also improve the selectivity of light hydrocarbon products formed within the reactor. The partially upgraded oil can flow out from the bottom of the reactor 30, then enter into the separation unit 40. In the separation unit 40, gas-liquid separation can occur. The cooling system 50 can comprise a water cooling heat exchanger at room temperature and atmospheric pressure (or any other suitable fluid heat exchanger) that cools the upgraded oil (e.g., to achieve a higher liquid yield). After the separation process, the emerging liquid oil product exits via a lower outlet 60 in the separator 40 and is collected in the product tank, while the gas emerges from a separate outlet 70 of the separator 40 and is subject to post processing. The hydrocarbons including methane can optionally be recycled back to the reactor 30 after the removal of sulfur containing compounds.

The upgrading process as described herein further minimize the generation of $CO_2$ in the process. In particular, upgrading processes utilizing the catalyst structures as described herein in which a first hydrocarbon product is provided as a feedstock to yield a second hydrocarbon product (having one or more different properties from the first hydrocarbon product as described herein) can result in the generation or production of $CO_2$ that is less than 5% by weight of the second hydrocarbon product, in some scenarios less than 4% by weight of the second hydrocarbon product, or less than 3% by weight of the second hydrocarbon product, or less than 2% by weight of the second hydrocarbon product, or even less than 1% by weight of the second hydrocarbon product (e.g., substantially no $CO_2$ is formed in the process).

Some examples of upgrading a heavy crude oil (also referred to as a raw oil) using a catalyst structure as described herein and the system of FIG. 1 are now described.

Example 4

A 1 wt. % Ag-1 wt. % Ga/zeolite A(1:1) catalyst was prepared in the following manner. A zeolite A ($SiO_2$:$Al_2O_3$ molar ratio of 1:1) support structure in powder form was obtained from Zeolyst USA. The zeolite was extruded into pellet form with the following recipe: catalyst:colloidal silica:methyl cellulose:acetic acid solution=1:0.5:0.2:0.1. After all components were added and suitably mixed, the extrusion was conducted with an extruder at room temperature. After extrusion, the wet catalyst pellets were dried at 95° C. overnight (e.g., about 8-12 hours), followed by calcination at 300° C. for 12 hours.

The following metal salts were dissolved in deionized water to form a metal precursor solution: $Ga(NO_3)_3 \cdot 9H_2O$ and $AgNO_3$. The shaped zeolite A support in pellet form was impregnated with the metal precursor solution to achieve a suitable metal weight loading. The obtained wet powder was first dried in an oven at 80° C. overnight, followed by calcination at 300° C. in static air with a ramp rate of 5° C./min.

A heavy oil sample with a viscosity of 2488 mPa·s at 15.6° C. was used as the feedstock to test the catalyst performance in a batch reactor. The reaction was carried out under 3.0 MPa and 400° C. in a methane environment. The weight ratio of oil to catalyst was 100:1. The product oil had a reduced viscosity of 103 mPa·s, and 97.2 wt. % mass liquid yield was achieved. A notable reduction of density from 0.96455 $g/cm^3$ to 0.95526 $g/cm^3$ was observed, indicating that a significant amount of heavy fraction was converted to light fraction during the upgrading process.

Example 5

A 1 wt. % Ag-1 wt. % Ga/ZSM-5(280:1) catalyst was prepared in the following manner. A $NH_4$-ZSM-5 ($SiO_2$:$Al_2O_3$ molar ratio of 280:1) support structure in powder form obtained from Zeolyst USA was calcined in static air at 600° C. for 3 hours. The zeolite was extruded into pellet form with the following recipe: catalyst:colloidal silica:colloidal silica:methyl cellulose:citric acid solution=1:2:0.2:0.1. After all components were added and suitably mixed, the extrusion was conducted with an extruder at room temperature. After extrusion, the wet catalyst pellets were dried at 95° C. overnight (e.g., about 8-12 hours), followed by calcination at 700° C. for 12 hours.

The following metal salts were dissolved in deionized water to form a metal precursor solution: $Ga(NO_3)_3 \cdot 9H_2O$ and $AgNO_3$. The shaped zeolite A support in pellet form was impregnated with the metal precursor solution to achieve a suitable metal weight loading. The obtained wet powder was first dried in an oven at 120° C. overnight, followed by calcination at 700° C. in static air with a ramp rate of 20° C./min.

A heavy oil sample with a viscosity of 2488 mPa·s at 15.6° C. was used as the feedstock to test the catalyst performance in a batch reactor. The reaction was carried out under 3.0 MPa and 400° C. in a methane environment. The weight ratio of oil to catalyst was 100:1. The product oil had a reduced viscosity of 67 mPa·s, and 94.7 wt. % mass liquid yield was achieved. A significant reduction of density from 0.96455 $g/cm^3$ to 0.94130 $g/cm^3$ was observed, indicating that a significant amount of heavy fraction was converted to light fraction during the upgrading process.

Example 6

A 1 wt. % Ag-1 wt. % Ga-5 wt. % Mo-10 wt. % Ce/HZSM-5(23:1) catalyst was prepared in the following manner. A $NH_4$-ZSM-5 ($SiO_2$:$Al_2O_3$ molar ratio of 23:1) support structure in powder form and obtained from Zeolyst USA was calcined in static air at 600° C. for 3 hours. The following metal salts were dissolved in deionized water to form a metal precursor solution: $Ce(NO_3)_3 \cdot 6H_2O$, $(NH_4)_6Mo_7O_{24} \cdot 4H_2O$, $Ga(NO_3)_3 \cdot 9H_2O$ and $AgNO_3$. The HZSM-5 support was impregnated with the metal precursor solution to achieve a suitable metal weight loading. The obtained wet powder was first dried in an oven at 92° C. overnight, followed by calcination at 550° C. in static air.

A heavy oil sample with a viscosity of 2488 mPa·s at 15.6° C. was used as the feedstock to test the catalyst performance in a batch reactor. The reaction was carried out under 1 atm and 500° C. in a methane environment. The weight ratio of oil to catalyst was 200:1. The product oil had a reduced viscosity of 3 mPa·s, and 48.8 wt. % mass liquid yield was achieved, indicating that the content of light fraction was increased dramatically during the upgrading process.

Example 7

A 1 wt. % Ag-1 wt. % Ga-5 wt. % Mo-10 wt. % Ce/HZSM-5(23:1) catalyst was prepared in the same manner as described in Example 6.

A heavy oil sample with a viscosity of 2488 mPa·s at 15.6° C. was used as the feedstock to test the catalyst performance in a batch reactor. The reaction was carried out under 100 atm and 300° C. in a methane environment. The weight ratio of oil to catalyst was 1:10. The product oil had a reduced viscosity of 118 mPa·s, and 95.8 wt. % mass liquid yield was achieved, indicating that the content of light fraction was increased dramatically during the upgrading process.

Example 8

A 1 wt. % Ag-1 wt. % Ga-5 wt. % Mo-10 wt. % Ce/HZSM-5(23:1) catalyst was prepared in the same manner as described in Example 6.

A heavy oil sample with a viscosity of 2488 mPa·s at 15.6° C. was used as the feedstock to test the catalyst performance in a fixed bed reactor. The reaction was carried out under 30 atm and 400° C. in a methane environment. The LHSV was set to be 100 $h^{-1}$. The product oil had a reduced viscosity of 1198 mPa·s, and 98.9 wt. % mass liquid yield was achieved, indicating that the content of light fraction was increased to a certain degree during the upgrading process.

Example 9

A 1 wt. % Ag-1 wt. % Ga-5 wt. % Mo-10 wt. % Ce/HZSM-5(23:1) catalyst was prepared in the same manner as described in Example 6.

A high sulfur content diesel sample with a sulfur content of 2306 ppm was used as the feedstock to test the catalyst performance in a fixed bed reactor. The reaction was carried out under 30 atm and 400° C. in a methane environment. The LHSV was set to be 2 $h^{-1}$. The product oil had a reduced sulfur content of 959 ppm, and 95.2 wt. % mass liquid yield was achieved. The 60% decrease of sulfur content indicated that most of the sulfur species in the original diesel sample was removed after the upgrading process.

Example 10

A 1 wt. % Ag-1 wt. % Ga-5 wt. % Mo-10 wt. % Ce/HZSM-5(23:1) catalyst was prepared in the same manner as described in Example 6.

A vacuum residue sample with a viscosity of 660,000 mPa·s at 30° C. (>1,000,000 at 15.6° C.) was used as the feedstock to test the catalyst performance in a batch reactor. The reaction was carried out under 30 atm and 400° C. in a methane environment. The weight ratio of oil to catalyst was 100:1. After the reaction, 96.2 wt. % mass liquid yield was achieved. It is worth noting that the viscosity was reduced dramatically to 3,927 mPa·s, indicating the upgrading process is highly effective for viscosity reduction of heavy oil samples. The lightening effect of this process was also confirmed by the decrease of density from 0.9742 g/cm$^3$ (vacuum resuide) to 0.9533 g/cm$^3$ (product).

Example 11

A 1 wt. % Ag-1 wt. % Ga-5 wt. % Mo-10 wt. % Ce/HZSM-5(23:1) catalyst was prepared in the same manner as described in Example 6.

A marine diesel oil sample with a sulfur content of 827 ppm was used as the feedstock to test the catalyst performance in a batch reactor. The reaction was carried out under 30 atm and 400° C. in a methane environment. The weight ratio of oil to catalyst was 100:1. The product oil had a reduced sulfur content of 694 ppm, and 99.9 wt. % mass liquid yield was achieved. It is suggested that the sulfur content was reduced to a certain degree during the upgrading process. The effect was also confirmed by the decrease of density from 0.8535 g/cm$^3$ (marine diesel oil) to 0.8519 g/cm$^3$ (product).

Example 12

A 1 wt. % Ag-1 wt. % Ga-5 wt. % Mo-10 wt. % Ce/HZSM-5(23:1) catalyst was prepared in the same manner as described in Example 6.

A diluted bitumen sample with a viscosity of 39.1 mPa·s at 15.6° C. was used as the feedstock to test the catalyst performance in a batch reactor. The reaction was carried out under 30 atm and 400° C. in a methane environment. The weight ratio of oil to catalyst was 100:1. The product oil had a reduced viscosity of 25.6 mPa·s, and 100.2 wt. % mass liquid yield was achieved. Besides, the density of oil sample also got reduced from 0.8590 to 0.8536 g/cm$^3$. It can be seen that the heavy fractions in diluted heavy oil sample can also be effect successfully converted to light fractions during the upgrading process.

Example 13

A 1 wt. % Ag-1 wt. % Ga-5 wt. % Mo-10 wt. % Ce/HZSM-5(23:1) catalyst was prepared in the same manner as described in Example 6.

A bunker fuel sample with a viscosity of 18,900 mPa·s at 15.6° C. and a sulfur content of 14,597 ppm was used as the feedstock to test the catalyst performance in a batch reactor. The reaction was carried out under 30 atm and 400° C. in a methane environment. The weight ratio of oil to catalyst was 100:1. The product oil had a reduced viscosity of 98 mPa·s, and 99.0 wt. % mass liquid yield was achieved. Besides, the sulfur content in product was dramatically reduced to 3,638 ppm. Besides, the density of oil sample was reduced from 0.97745 to 0.95802 g/cm$^3$. It is confirmed that the aforementioned catalytic upgrading process is capable of significantly reducing the sulfur content as well as converting heavy fractions into light fractions simultaneously, which is highly favorable for the utilization of bunker fuel resources.

Example 14

A 1 wt. % Ag-1 wt. % Ga-5 wt. % Mo-10 wt. % Ce/HZSM-5(23:1) catalyst was prepared in the same manner as described in Example 6.

A jet fuel sample was used as the feedstock to test the catalyst performance in a fixed bed reactor. The reaction was carried out under 30 atm and 400° C. in a methane environment. The LHSV was set to be 2 $h^{-1}$. The distribution of different types of species in feed and product oil is listed in Table 3. It is apparent that the aromatic content increased dramatically after the reaction, especially marked by the notable increase of BTEX content from 2.74 wt % to 26.83 wt %. It is highly promising since the generated products are greatly economically valuable.

TABLE 3

Distribution of different types of species in feed and product sample for Example 14

|  | Paraffin | Naphthene | Olefin | Aromatic | Benzene | Toluene | Ethylbenzene | Xylene |
|---|---|---|---|---|---|---|---|---|
| Feed | 53.19 | 14.92 | 1.05 | 30.84 | 0 | 0 | 0 | 2.74 |
| Product | 21.11 | 15.82 | 1.61 | 61.45 | 2.35 | 9.13 | 2.73 | 12.62 |

Example 15

A raw oil is preheated to 70° C. in the crude oil tank. The preheated crude oil flow is mixed with the high pressure methane before entering into the reactor of the reaction system. The fixed bed reactor is loaded with 1 wt. % Ag-1 wt. % Ga/HZSM-5 (23:1) catalyst structure (e.g., a catalyst structure formed in the same or similar process as described in Example 1). The reactor is charged to about 50 atm $CH_4$ and heated to about 420° C. The liquid flow of crude oil has a liquid hourly space velocity (LHSV) of about 1 $h^{-1}$ and gas flow has gas hourly space velocity (GHSV) of about 12 $h^{-1}$. The heavy oil reacts with methane in the presence of the catalyst structure in the reactor. After the reaction is complete (with a residence time of 3-15 minutes), the partially upgraded oil flows out from the bottom of the reactor, and then enters the separation unit. In the separation unit, gas-liquid separation occurs. The water cooling system is controlled to decrease the temperature of the separation unit to about room temperature. After separation, the liquid flows to the product tank and collected, while the separated gas flows to the post processing system. After upgrading under methane and utilizing the catalyst structure, the viscosity of heavy oil is reduced from 6,774 mPa·s to 119 mPa·s, and a mass liquid yield of 103% is achieved.

Example 16

A raw oil is preheated to 70° C. in the crude oil tank. The preheated crude oil flow is mixed with the high pressure $CH_4$ before entering into the reactor of the reaction system. The fixed bed reactor is loaded with 1 wt. % Ag-1 wt. % Ga/HZSM-5 (23:1) catalyst structure (e.g., a catalyst structure formed in the same or similar process as described in Example 1). The reactor is charged to about 100 atm $CH_4$ and heated to about 420° C. The liquid flow of crude oil has a liquid hourly space velocity (LHSV) of about 0.5 $h^{-1}$ and gas flow has gas hourly space velocity (GHSV) of about 20 $h^{-1}$. The heavy oil reacts with methane in the reactor. After the reaction is complete (with a residence time of 3-15 minutes), the partially upgraded oil flows out from the bottom of the reactor, and then enters the separation unit. In the separation unit, gas-liquid separation occurs. The water cooling system is controlled to decrease the temperature of the separation unit to about room temperature. After separation, the liquid flows to the product tank and collected, while the separated gas flows to the post processing system. After upgrading under methane and utilizing the catalyst structure, the viscosity of heavy oil is reduced from about 1,911 mPa·s to about 42 mPa·s. In addition, a mass liquid yield of 100% is achieved.

Further examples of the performance of catalyst structures for upgrading hydrocarbons in a reaction system as depicted in FIG. 1 are depicted in Table 4. The catalysts used for each process described in Table 4 are all 1 wt. % Ag-1 wt. % Ga/HZSM-5(23:1) (formed utilizing a process as described in Example 1). All catalysts were in the pellet form and all reactions were performed in a continuous fixed bed reactor (similar to the test performed in Example 1). The catalyst used in the entry 14 was a regenerated one with the following regeneration process: rinsing the catalyst structure with toluene; drying the rinsed catalyst structure in air to remove toluene from the catalyst structure; and heating the dried catalyst structure in air at a temperature of at least about 500° C. for a time period of at least about 3 hours. The upgrading processes were performed in the presence of methane, nitrogen or hydrogen, where the operating conditions in the reactor are further described for each example, as well as the initial and final viscosities of the oil that is upgraded and the liquid yield. As can be seen in the data provided in Table 4, the upgraded oil product in each example has a reduced or lower viscosity in relation to the starting or raw oil for each process performed in methane, nitrogen or hydrogen, and the liquid yield is also very high for each example.

TABLE 4

Further examples of heavy oil upgrading process

| Entry | Temperature/ °C. | Pressure/ MPa | Gas | Viscosity of Raw Oil/ mPa·s | Viscosity of Product oil/ mPa·s | Liquid yield/% |
|---|---|---|---|---|---|---|
| 1 | 410 | 10 | $CH_4$ | 1,911 | 179 | 103 |
| 2 | 420 | 5 | $CH_4$ | 345 | 46 | 101 |
| 3 | 400 | 3 | $CH_4$ | 111,917 | 370 | 99 |
| 4 | 400 | 5 | $CH_4$ | 111,917 | 349 | 98 |
| 5 | 400 | 8 | $CH_4$ | 111,917 | 247 | 97 |
| 6 | 400 | 10 | $CH_4$ | 111,917 | 245 | 101 |
| 7 | 410 | 10 | $CH_4$ | 111,917 | 225 | 106 |
| 8 | 420 | 5 | $CH_4$ | 111,917 | 205 | 109 |
| 9 | 420 | 10 | $CH_4$ | 111,917 | 151 | 97 |
| 10 | 380 | 5 | $CH_4$ | 111,917 | 589 | 102 |
| 11 | 400 | 5 | $N_2$ | 111,917 | 1,009 | 104 |
| 12 | 420 | 5 | $N_2$ | 111,917 | 887 | 98 |
| 13 | 400 | 5 | $H_2$ | 111,917 | 223 | 99 |
| 14 | 400 | 3 | $CH_4$ | 111,917 | 530 | 98 |

The upgrading processes as described herein therefore facilitate the formation of a second (upgraded) hydrocarbon product from a first hydrocarbon product. Some non-limiting examples of types of upgraded hydrocarbon products that can be formed utilizing an upgrading process with a catalyst structure as described herein include:

A method of upgrading a heavy oil that comprises receiving a feedstock of heavy oil in a reactor and reacting the heavy oil in the reactor in the presence of a gas and a catalyst structure as described herein to produce an oil product, where the gas comprises methane, hydrogen or nitrogen and one or more of the following change in properties between the heavy oil and the oil product is achieved: a viscosity of the oil product is less than a viscosity of the heavy oil, a density of the product oil product is less than a density of the heavy oil, a sulfur content of the oil product is less than a sulfur content of the heavy oil, a TAN of the oil product is less than a TAN of the heavy oil, an aromatic content of the oil product is greater than an aromatic content of the heavy oil, an asphaltene content of the oil product is less than an asphaltene content of the heavy oil, a H/C ratio of the oil product is greater than a H/C ratio of the heavy oil, and/or a nitrogen content of the oil product is less than a nitrogen content of the heavy oil.

A method of upgrading a light oil that comprises receiving a feedstock of light oil in a reactor and reacting the light oil in the reactor in the presence of a gas and a catalyst structure as described herein to produce an oil product, where the gas comprises methane, hydrogen or nitrogen and one or more of the following change in properties between the light oil and the oil product is achieved: a sulfur content of the oil product is less than a sulfur content of the light oil, a nitrogen content of the oil product is less than a nitrogen content of the light oil, an aromatic content of the oil product is greater than an aromatic content of the light oil, and/or a pour point of the oil product is less than a pore point of the light oil (which facilitates pipelining of light oils that are solid at room temperature).

A method of upgrading a resid that comprises receiving a feedstock of resid in a reactor and reacting the resid in the reactor in the presence of a gas and a catalyst structure as described herein to produce a resid product, where the gas comprises methane, hydrogen or nitrogen and one or more of the following change in properties between the resid and the resid product is achieved: an aromatics content of the reside product is greater than an aromatics content of the resid, a viscosity of the reside product is less than a viscosity of the resid, a density of the reside product is less than a density of the resid, a TAN of the resid product is less than a TAN of the resid, a H/C ratio of the resid product is greater than a H/C ratio of the resid, and/or a nitrogen content of the resid product is less than a nitrogen content of the resid.

A method of upgrading a gasoline that comprises receiving a feedstock of gasoline in a reactor and reacting the gasoline in the reactor in the presence of a gas and a catalyst structure as described herein to produce a gasoline product, where the gas comprises methane, hydrogen or nitrogen and at least the following change in properties between the gasoline and the gasoline product is achieved: an aromatics content of the gasoline product is greater than an aromatics content of the gasoline, and/or an octane number of the gasoline product is greater than an octane number of the gasoline.

A method of upgrading a diesel fuel that comprises receiving a feedstock of diesel fuel in a reactor and reacting the diesel fuel in the reactor in the presence of a gas and a catalyst structure as described herein to produce a diesel fuel product, where the gas comprises methane, hydrogen or nitrogen and one or more of the following change in properties between the diesel fuel and the diesel fuel product is achieved: a sulfur content of the diesel fuel product is less than a sulfur content of the diesel fuel, and/or a cetane number of the diesel fuel product is greater than a cetane number of the diesel fuel.

A method of upgrading a jet fuel that comprises receiving a feedstock of jet fuel in a reactor and reacting the jet fuel in the reactor in the presence of a gas and a catalyst structure as described herein to produce a jet fuel product, where the gas comprises methane, hydrogen or nitrogen and one or more of the following change in properties between the jet fuel and the jet fuel product is achieved: an aromatics content of the jet fuel product is greater than an aromatics content of the jet fuel (this feature is typically desirable to ensure proper seals in jet engines), and/or a sulfur content of the jet fuel product is less than a sulfur content of the jet fuel.

A method of upgrading a bunker fuel that comprises receiving a feedstock of bunker fuel in a reactor and reacting the bunker fuel in the reactor in the presence of a gas and a catalyst structure as described herein to produce a bunker fuel product, where the gas comprises methane, hydrogen or nitrogen and at least the following change in properties between the bunker fuel and the bunker fuel product is achieved: a sulfur content of the bunker fuel product is less than the sulfur content of the bunker fuel.

A method of upgrading a bio oil that comprises receiving a feedstock of bio oil in a reactor and reacting the bio oil in the reactor in the presence of a gas and a catalyst structure as described herein to produce a bio oil product, where the gas comprises methane, hydrogen or nitrogen and at least the following change in properties between the bio oil and the bio oil product is achieved: an oxygen content of the bio oil product is less than an oxygen content of the bio oil, and a H/C ratio of the bio oil product is greater than a H/C ratio of the bio oil.

A method of upgrading an FT (Fischer-Tropsch) wax and oil that comprises receiving a feedstock of the FT wax and oil in a reactor and reacting the FT wax and oil in the reactor in the presence of a gas and a catalyst structure as described herein to produce a FT wax and oil product, where the gas comprises methane, hydrogen or nitrogen and at least one of the following change in properties between the FT wax and oil and the FT wax and oil product is achieved: a viscosity of the FT wax and oil product is less than a viscosity of the FT wax and oil, a sulfur content of the FT wax and oil product is less than the sulfur content of the FT wax and oil, an olefin content of the FT wax and oil product is less than an olefin content of the FT wax and oil, and/or a pour point of the FT wax and oil product is less than a pore point of the FT wax and oil.

A method of upgrading a feedstock that comprises receiving a feedstock of oil in a reactor and reacting the oil in the reactor in the presence of a gas and a catalyst structure as described herein to produce an oil product, where the gas comprises methane, hydrogen or nitrogen and one or more of the following change in properties between the oil and the oil product is achieved: a viscosity of the oil product is less than a viscosity of the heavy oil, a density of the product oil product is less than a density of the heavy oil, a sulfur content of the oil product is less than a sulfur content of the heavy oil, a TAN of the oil product is less than a TAN of the heavy oil, an aromatic content of the oil product is greater than an aromatic content of the oil, with the purpose of producing an extender oil or softening oil, which is added to rubber compounds in the production process for tires and other rubber goods to achieve an acceptable process ability.

While the invention has been described in detail and with reference to specific embodiments thereof, it will be apparent to one skilled in the art that various changes and modifications can be made therein without departing from the spirit and scope thereof.

Thus, it is intended that the present invention covers the modifications and variations of this invention provided they come within the scope of the appended claims and their equivalents.

What is claimed:

1. A catalyst structure for upgrading a hydrocarbon feedstock that results in a change in one or more properties of the hydrocarbon feedstock, the catalyst structure comprising:
  a porous support structure comprising an aluminosilicate material, and
  a plurality of metals loaded in the porous support structure, the plurality of metals comprising:
    (a) at least three metals selected from the group consisting of Ga, Ag, Zn, Co and Ce; or
    (b) at least three metals selected from the group consisting of Ga, Ag, Mo, Zn and Co;
  wherein each metal loaded in the porous support structure is present in an amount from about 0.1 wt % to about 20 wt % based upon the weight of the porous support structure.

2. The catalyst structure of claim 1, wherein the porous support structure comprises an aluminosilicate material with a ratio of silicon oxide to aluminum oxide from 1:1 to 280:1.

3. The catalyst structure of claim 1, wherein the metals loaded within the porous support structure include Ga, Ag, Mo, Co and Ce.

4. The catalyst structure of claim 1, wherein the porous support structure comprises an aluminosilicate material having the following metals loaded in the porous support structure at the following weight percentages:
Ag: 1 wt %;
Ga: 1 wt %;
Co: 2 wt %;
Mo: 6 wt %; and
Ce: 10 wt %.

5. The catalyst structure of claim 1, wherein the porous support structure comprises an aluminosilicate material having the following metals loaded in the porous support structure at the following weight percentages:
Ag: 1 wt %;
Ga: 1 wt %;
Mo: 5 wt %; and
Ce: 10 wt %.

6. A method of forming the catalyst structure of claim 1, the method comprising:
dissolving three or more metal salts in water to form a metal precursor solution, the three or more metal salts including the three or more metals;
loading the metal precursor solution into the porous support structure;
drying the support structure loaded with metal precursor for a period of at least 2 hours at a temperature from about 80° C. to about 120° C.; and
calcining the dried support structure loaded with metal precursor at a temperature ranging from about 300° C. to about 700° C. and at a heating rate that increases in an amount ranging from about 5° C./min to about 20° C./min.

7. The method of claim 6, further comprising regenerating the catalyst structure by performing the following steps:
rinsing the catalyst structure with toluene;
drying the rinsed catalyst structure in air to remove toluene from the catalyst structure; and
heating the dried catalyst structure in air at a temperature of at least about 500° C. for a time period of at least about 3 hours.

8. The method of claim 7, further comprising repeating the regenerating of the catalyst structure a plurality of times.

9. The method of claim 6, wherein the porous support structure comprises a plurality of granules such that the catalyst structure is formed as a powder.

10. The method of claim 9, further comprising, after calcination, forming a pellet from the catalyst structure by:
combining the catalyst structure in powder form with a binder material in an acidic solution to form a mixture;
extruding the mixture through a forming die to form an extruded element; and
drying and calcining the extruded element to form the pellet.

11. The method of claim 10, wherein the binder material comprises colloidal silica and methyl cellulose, the acidic solution comprises acetic acid or citric acid.

12. The method of claim 11, wherein the combining further comprises:
combining the catalyst structure in powder form with methyl cellulose and the acidic solution to form a first mixture; and
combining colloidal silica with the first mixture to form a second mixture to be extruded through the forming die.

13. The method of claim 11, wherein the mixture comprises the following:
a weight ratio of catalyst powder to colloidal silica that ranges from 1:0.5 to 1:2;
a weight ratio of catalyst powder to methyl cellulose that ranges from 1:0.05 to 1:0.2; and
a weight ratio of catalyst powder to acidic solution that ranges from 1:0.1 to 1:0.5.

14. A method of upgrading a first hydrocarbon product to form a second hydrocarbon product, the method comprising:
receiving a feedstock of the first hydrocarbon product in a reactor; and
reacting the first hydrocarbon product in the reactor in the presence of a gas and the catalyst structure of claim 1 to produce the second hydrocarbon product, wherein the gas comprises methane, hydrogen or nitrogen, and one or more properties of the second hydrocarbon product is changed in relation to the first hydrocarbon product.

15. The method of claim 14, wherein the reactor comprises one or a combination of the following: a batch reactor system, a continuous tubular reactor (CTR), a continuous stirred-tank reactor (CSTR), a semi batch reactor, and a non-thermal plasma reactor.

16. The method of claim 15, wherein the catalyst structure is provided within the reactor in the form of a fixed bed, a trickle-bed, a moving bed, a rotating bed, a fluidized bed, or as a slurry.

17. The method of claim 14, wherein a reaction temperature within the reactor is within a range of about 300° C. to about 500° C.

18. The method of claim 17, wherein a pressure within the reactor is between about 1 atm and about 200 atm.

19. The method of claim 14, wherein the reactor comprises a batch reactor, and a mass ratio of heavy oil feedstock to catalyst structure is from about 200:1 to about 1:10.

20. The method of claim 14, wherein the reactor comprises a continuous flow reactor, and a liquid hourly space velocity (LHSV) of the heavy oil feedstock is in a range from about 0.1 $h^{-1}$ to about 100 $h^{-1}$.

21. The method of claim 14, wherein the one or more properties of the second hydrocarbon product that is changed in relation to the first hydrocarbon product is selected from the group consisting of viscosity, density, sulfur content, amount of olefins, amount of one or more aromatic hydrocarbons, amount of one or more paraffins, total acid number (TAN), hydrogen to carbon ratio, and cetane number.

22. The method of claim 14, further comprising, after the reacting of the first hydrocarbon product in the reactor in the presence of the gas and the catalyst structure to produce the second hydrocarbon product, regenerating the catalyst structure by performing the following steps:
rinsing the catalyst structure with toluene;
drying the rinsed catalyst structure in air to remove toluene from the catalyst structure; and
heating the dried catalyst structure in air at a temperature of at least about 500° C. for a time period of at least about 3 hours.

* * * * *